United States Patent
Ando et al.

(10) Patent No.: US 9,417,451 B2
(45) Date of Patent: Aug. 16, 2016

(54) SCREEN MEMBER AND HEAD-UP DISPLAY APPARATUS

(71) Applicant: DENSO CORPORATION, Kariya, Aichi-pref. (JP)

(72) Inventors: Hiroshi Ando, Nagoya (JP); Takayuki Fujikawa, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/403,961

(22) PCT Filed: May 28, 2013

(86) PCT No.: PCT/JP2013/003358
§ 371 (c)(1),
(2) Date: Nov. 25, 2014

(87) PCT Pub. No.: WO2013/179649
PCT Pub. Date: Dec. 5, 2013

(65) Prior Publication Data
US 2015/0103410 A1    Apr. 16, 2015

(30) Foreign Application Priority Data
May 30, 2012    (JP) .................................. 2012-123541

(51) Int. Cl.
*G02B 27/14* (2006.01)
*G02B 27/01* (2006.01)
(Continued)

(52) U.S. Cl.
CPC .......... *G02B 27/0101* (2013.01); *G02B 3/0043* (2013.01); *G02B 3/0056* (2013.01); *G02B 27/48* (2013.01); *G02B 26/10* (2013.01); *G02B 2027/0118* (2013.01)

(58) Field of Classification Search
USPC .................................................. 359/630–635
See application file for complete search history.

(56) References Cited

U.S. PATENT DOCUMENTS

| | | | | |
|---|---|---|---|---|
| 7,637,617 B2 * | 12/2009 | Liu | ........................ | G02B 17/06 345/7 |
| 7,844,320 B2 * | 11/2010 | Shahidi | .................... | A61B 5/06 600/407 |

(Continued)

FOREIGN PATENT DOCUMENTS

| | | |
|---|---|---|
| JP | H08227071 A | 9/1996 |
| JP | H10311910 A | 11/1998 |

(Continued)

OTHER PUBLICATIONS

International Search Report and Written Opinion (in Japanese with English Translation) for PCT/JP2013/003358, mailed Jun. 25, 2013; ISA/JP.

(Continued)

*Primary Examiner* — Mohammed Hasan
(74) *Attorney, Agent, or Firm* — Harness, Dickey & Pierce, P.L.C.

(57) ABSTRACT

A head-up display apparatus projects a display image onto a projection surface of a windshield so that a viewer views a virtual image of the display image from an eye box. A screen used in the apparatus is constructed of a plurality of micromirrors. Each micromirror has a convex surface portion being curved to magnify a laser beam toward the eye box. A scanned surface of the screen is provided by an array of the convex surface portions. In a cross section intersecting the scanned surface, adjacent convex surface portions have different curved shapes. Thus, brightness unevenness of the display image caused by interference of laser beams can be reduced while maintaining a simple structure of the screen such as a microlens array.

18 Claims, 9 Drawing Sheets

(51) Int. Cl.
*G02B 27/48* (2006.01)
*G02B 3/00* (2006.01)
*G02B 26/10* (2006.01)

(56) References Cited

U.S. PATENT DOCUMENTS

| 8,331,022 | B2* | 12/2012 | Mikoshiba | G03B 21/60 |
| | | | | 359/443 |
| 2009/0135374 | A1 | 5/2009 | Horiuchi et al. | |
| 2010/0259818 | A1 | 10/2010 | Mikoshiba | |

FOREIGN PATENT DOCUMENTS

| JP | 2000267084 A | 9/2000 |
| JP | 2001188110 A | 7/2001 |
| JP | 2003029344 A | 1/2003 |
| JP | 2005500567 A | 1/2005 |
| JP | 2005292679 A | 10/2005 |
| JP | 2007523369 A | 8/2007 |
| JP | 2008026592 A | 2/2008 |
| JP | 2009128659 A | 6/2009 |
| JP | 2010145746 A | 7/2010 |
| JP | 2010262264 A | 11/2010 |
| JP | 2011145382 A | 7/2011 |
| JP | 2012032721 A | 2/2012 |
| JP | 2012163613 A | 8/2012 |
| WO | WO-2005078511 A1 | 8/2005 |

OTHER PUBLICATIONS

Office Action in the corresponding JP Application No. 2012-123541 mailed on Jun. 24, 2014.
Korean Examination Report dated Oct. 19, 2015 in corresponding KR application No. 10-2014-7033164.
Office Action dated Jan. 19, 2016 in the corresponding Chinese Application No. 201380027408.1 with English translation.

* cited by examiner

SCREEN MEMBER AND HEAD-UP DISPLAY APPARATUS

CROSS REFERENCE TO RELATED APPLICATIONS

This application is a U.S. National Phase Application under 35 U.S.C. 371 of International Application No. PCT/JP2013/003358 filed on May 28, 2013 and published in Japanese as WO 2013/179649 on Dec. 5, 2013. This application is based on and claims the benefit of priority from Japanese Patent Application No. 2012-123541 filed on May 30, 2012. The entire disclosures of all of the above applications are incorporated herein by reference.

TECHNICAL FIELD

The present disclosure relates to a screen member on which a display image is depicted by scanning a laser beam, and a head-up display apparatus using the screen member.

BACKGROUND ART

Conventionally, is has been known a head-up display apparatus that projects a display image onto a windshield or the like of a vehicle so that a virtual image of the display image can be viewed from an assumed viewing space. As a kind of such apparatus, for example, a patent literature 1 discloses a scanned-beam head-up display apparatus having a microlens array on which a display image is depicted by a scanning beam projected from a beam generator. The microlens array is made of a plurality of lenslets arrayed for expanding a laser beam toward the viewing space.

When the scanning beam is applied to the microlens array of the patent literature 1 in which the lenslets having the same shape are arrayed, a laser beam diffracted by one lenslet and a laser beam diffracted by another lenslet adjacent to the one are interfered with each other and intensified. In the case where the lenslets have the same shape, positions at which the laser beams are intensified by being interfered to each other are regularly aligned in the display image. Therefore, even when the laser beam is scanned, the position at which the laser beams are intensified by being interfered are not substantially moved. As a result, intensity distribution of the laser beams reaching the viewing space has unevenness, and thus the display image viewed by a viewer has unevenness.

In the structure disclosed by the patent literature 1, a pair of microlens arrays is arranged in an opposed manner. In the structure, a laser beam having been passed through one of the microlens arrays is diffused by the other one of the microlens, thereby reducing the unevenness of the intensity distribution caused by the interference. In the apparatus of the patent literature 1, however, plural microlens arrays are used, and it is necessary to adjust the positions of the plural microlens at high accuracy. As a result, the structure associated with the microlens arrays are necessarily complicated.

PRIOR ART LITERATURE

Patent Literature

Patent Literature 1: JP2007-523369 A (corresponding to WO2005/078511A1)

SUMMARY OF INVENTION

The present disclosure is made in view of the foregoing issues, and it is an object of the present disclosure to provide a technology regarding a screen member such as a microlens array, which is capable of reducing unevenness of brightness of a display image caused by interference of laser beams while maintaining a simple structure.

Means to Solve the Problem

According to an aspect of the present disclosure, a screen member has a scanned surface on which a display image to be viewed from a predetermined viewing space is depicted by scanning a laser beam onto the scanned surface. The screen member includes a plurality of optical elements each having a curved surface portion being curved to magnify a laser beam toward the viewing space. The curved surface portions are arranged to provide the scanned surface. In a cross-section intersecting the scanned surface, adjacent curved surface portions have different curved shapes.

In the above screen member, the curved shape of the curved surface portion is different between adjacent optical elements, in the cross-section intersecting the scanned surface. Therefore, positions at which the laser beams, which have been diffracted by the curved surface portions, are intensified to each other due to interference are unevenly arranged. As such, when a laser beam for depicting the display image is scanned, the position at which the laser beams are intensified to each other due to the interference moves with time at a speed that the viewer cannot perceive. Therefore, intensity distribution of the laser beams reaching the viewing space can be substantially equalized. As described above, since the curved surface portions having different curved shapes in the cross-section are arranged, it is possible to reduce brightness unevenness of the display image caused by the interference of the laser beams while restricting the structure of the screen member from being complicated.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, embodiments of the present disclosure will be described with reference to the drawings. It is to be noted that components corresponding to each other in the embodiments will be designated with the same reference numbers, and descriptions thereof may not be repeated. In a case where only a part of the structure is described in an embodiment, the other parts of the structure of the embodiment can be provided by the same parts of the structure described in a preceding embodiment. Each of the embodiments may not be limited to the structure explicitly described, but may be provided by partly combining structures of any embodiments in any ways, though not explicitly described, as long as there is no difficulty in such combinations.

(First Embodiment)

Figure 1A:
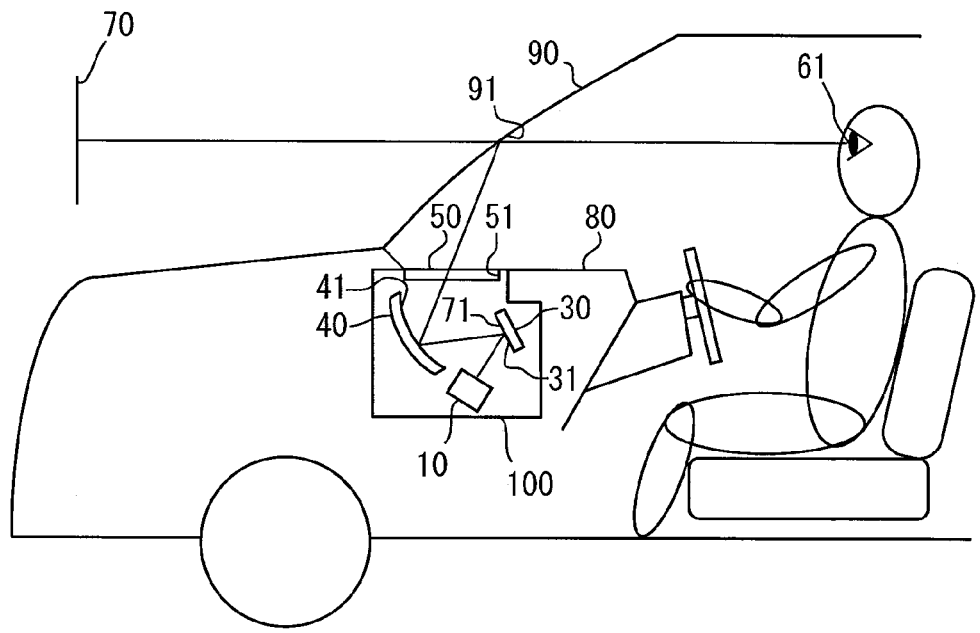
FIG. 1A is a diagram for explaining an arrangement of a head-up display apparatus in a vehicle according to a first embodiment of the present disclosure.
Figure 1B:
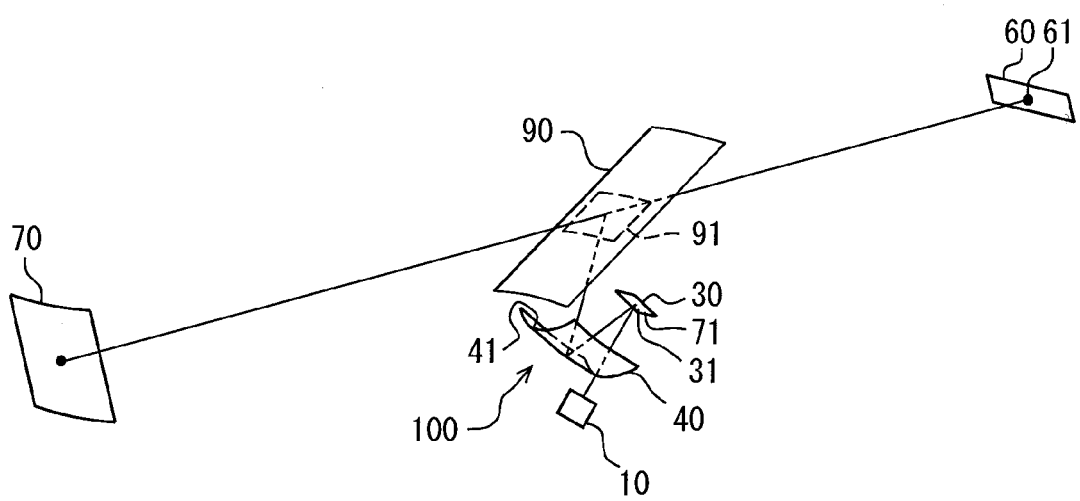
FIG. 1B is a diagram schematically illustrating a structure of the head-up display apparatus shown in FIG. 1A.
Figure 2:
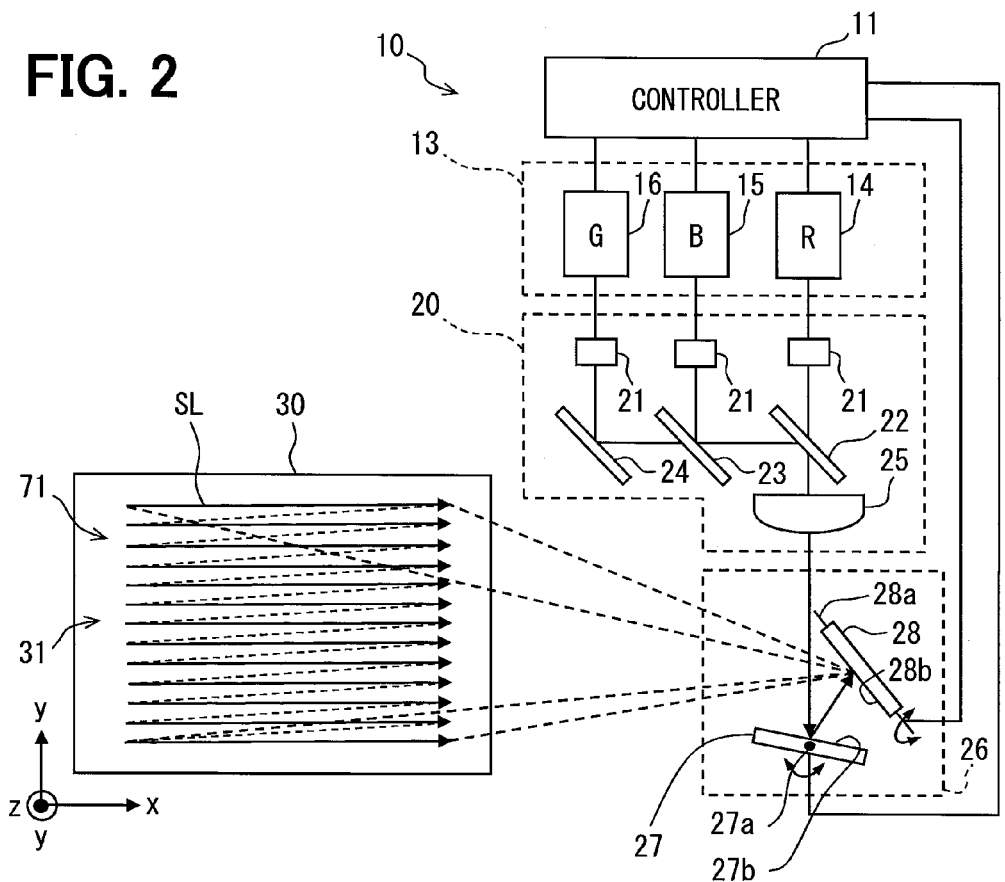
FIG. 2 is a diagram for explaining a structure and an operation of a laser scanner in detail.

FIGS. 1A and 1B show a head-up display apparatus 100 according to a first embodiment of the present disclosure. The head-up display apparatus 100 is, for example, housed in an instrument panel of a vehicle. The head-up display apparatus 100 projects a display image 71, which has passed through a transparent dust-proof cover 50 covering an opening 51, onto a display member, such as a windshield 90 of a vehicle, so that a virtual image 70 of the display image 71 is able to be viewed from an assumed eye box 60. The eye box 60 is defined to a size in which a horizontal dimension thereof is approximately 100 to 200 millimeters and a vertical dimension thereof is approximately 40 to 90 millimeters. A projection surface 91 onto which the display image 71 is projected by the head-up display apparatus 100 is provided on an interior surface of the windshield 90 facing a passenger compartment of the vehicle. The projection surface 91 is curved into a concave shape to as to provide a magnification effect. A light of the display image 71, which has been projected onto the projection surface 91, is reflected toward the eye box 60 by the projection surface 91 to reach an eye point 61 of a viewer. The viewer who perceives the light of the display image 71 can view the virtual image 70 of the display image 71 that is imaged in front of the windshield 90. The display image 71 projected onto the projection surface 91 is an image in which a horizontal dimension is greater than a vertical dimension, because the eye point 61 of the viewer generally moves more easily in a horizontal direction than in a vertical direction. The display image 71 includes image portions indicating such as a vehicle-travel speed, indication of a direction of travel by a navigation system, and warning of the vehicle to which the head-up display apparatus 100 is equipped.

(Basic Structure)

Firstly, a basic structure of the head-up display apparatus 100 will be described with reference to FIGS. 1A to 3. The head-up display apparatus 100 includes a laser scanner 10, a screen 30 and a concave mirror 40.

The laser scanner 10 is disposed opposite to the projection surface 91 with respect to the screen 30 in the vertical direction. The laser scanner 10 includes a light source unit 13, an optical unit 20, a micro electro mechanical systems (MEMS) mirror unit 26 and a controller 11.

The light source unit 13 is made of three laser projecting portions 14, and 16, and the like. The laser projecting portions 14, 15 and 16 project laser beams having different frequencies, that is, having different hues. Specifically, the laser projecting portion 14 projects a red laser beam. The laser projecting portion 15 projects a blue laser beam. The laser projecting portion 16 projects a green laser beam. Various colors can be generated by adding and mixing the laser beams having different hues. Each of the laser projecting portions 14, 15 and 16 is connected to the controller 11. Each of the laser projecting portions 14, 15 and 16 projects the laser beam having the respective hue according to a control signal provided from the controller 11.

The optical unit 20 includes three collimating lens 21, dichroic filters 22, 23 and 24, a condenser lens 25, and the like. The collimating lens 21 are correspondingly arranged to the laser projecting portion 14, 15 and 16 in a direction the laser beams are projected. The collimating lens 21 refracts the laser beam to generate a parallel light The dichroic filters 22, 23 and 24 are correspondingly arranged opposite to the laser projecting portions 14, 15 and 16 with respect to the collimating lens 21 in the projection direction. The dichroic filter 22 arranged in the projection direction of the laser projecting portion 14 transmits a light with a frequency indicating red, and reflects lights with the other frequencies. The dichroic filter 23 arranged in the projection direction of the laser projecting portion 15 reflects the light with a frequency indicating blue, and transmits the lights with the other frequencies. The dichroic filter 2 arranged in the projection direction of the laser projecting portion 16 reflects the light with a frequency indicating green, and transmits the lights with the other frequencies. The laser beams projected from the respective laser projecting portions 14, 15 and 16 reach the condenser lens 25 by the functions of the respective dichroic filters 22, 23 and 24.

The condenser lens 25 is a plano convex lens having a flat incidence surface and a convex emission surface. The condenser lens 25 refracts the laser beam entering the incidence surface thereof to converge. Therefore, the laser beams having passed through the condenser lens 25 concentrate on a scanned surface 31 of the screen 30, which will be described later.

The MEMS mirror unit 26 includes a horizontal scanner 27, a vertical scanner 28, and the like. The horizontal scanner 27 and the vertical scanner 28 are connected to the controller 11, respectively. The horizontal scanner 27 is provided with a rotation shaft 27a, and a MEMS reflection surface 27b on which a metal film is formed by vapor deposition of aluminum or the like. The vertical scanner 28 is provided with a rotation shaft 28a, and a MEMS reflection surface 28b on which a metal film is formed by vapor deposition of aluminum or the like.

The horizontal scanner 27 is arranged in such a manner that the MEMS reflection surface 27b faces the optical unit 20 and the vertical scanner 28. The MEMS reflection surface 27b is supported by the rotation shaft 27a extending in the vertical direction. The MEMS reflection surface 27a is rotatable about the rotation shaft 27a. A driving part of the horizontal scanner 27 rotates the MEMS reflection surface 27b about the rotation shaft 27a according to a driving signal provided from the controller 11.

On the other hand, the vertical scanner 28 is arranged in such a manner that the MEMS reflection surface 28b faces the MEMS reflection surface 27b of the horizontal scanner 27 and the screen 30. The MEMS reflection surface 28b is supported by the rotation shaft 28a extending in the horizontal direction, and is rotatable about the rotation shaft 28a. A driving part of the vertical scanner 28 rotates the MEMS reflection surface 28b about the rotation shaft 28a according to a driving signal provided from the controller 11.

The controller 11 is a control unit made of a processor and the like. The controller 11 is connected to the respective laser projecting portions 14, 15 and 16 and the respective scanners 27 and 28. The controller 11 outputs controls signals to the respective laser projecting portions 14, 15 and 16 to intermittently pulse-light the laser beams. In addition, the controller 11 outputs the driving signals to the respective scanners 27 and 28 to control the directions of the laser beams reflected by the respective MEMS reflection surfaces 27b, 28b as scanning lines SL shown in FIG. 2.

The laser scanner 10, which has the structure as described above, projects the light to be imaged as the display image 71 onto the later-described scanned surface 31 of the screen 30 by the control of the controller 11. Specifically, the display image 71 is made by dot lights as pixels by scanning a dot laser beam projected. The display image 71 is depicted and imaged on the scanned surface 31 of the screen 30.

Figure 3:
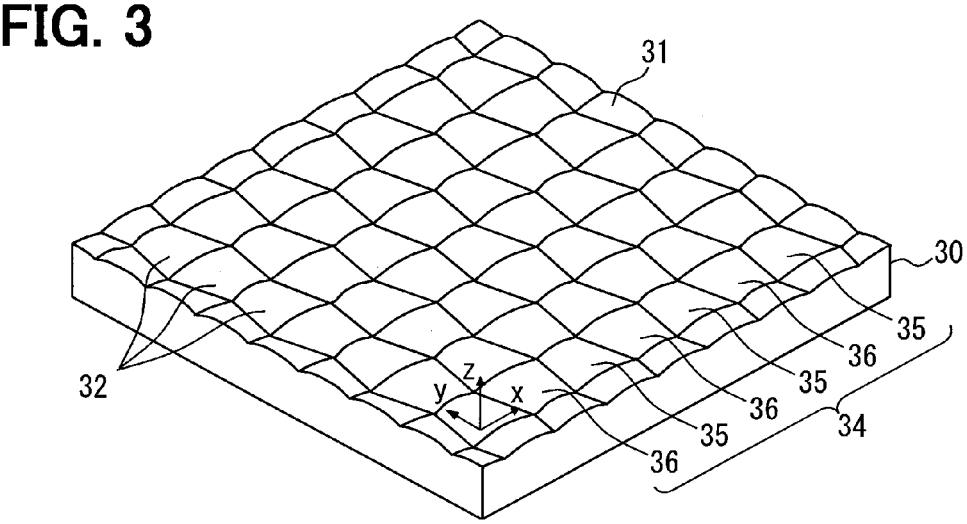
FIG. 3 is a diagram schematically illustrating a perspective view of a micromirror array used as a screen of the head-up display apparatus.

As shown in FIGS. 1A, 1B and 3, the screen 30 is a reflecting screen formed by vapor-depositing aluminum or the like on a surface of a substrate made of glass or the like. The screen 30 is a so-called micromirror array in which a plurality of fine micromirrors 34 is arranged in an x-axis direction and in a y-axis direction. The scanned surface 31 of the screen 30 is provided by a metal thin film made of aluminum or the like vapor-deposited. Each of the micromirrors 34 has a convex surface portion 32 that is curved to reflect and diffract a laser beam toward a reflection surface 41 (see FIG. 1B and the like) as well as to magnify the laser beam toward the eye box 60. The scanned surface 31 is provided by an array of a plurality of convex surface portions 32.

As shown in FIGS. 1A and 1B, the concave mirror 40 is formed by vapor-depositing aluminum or the like on a surface of a substrate made of glass or the like. The concave mirror 40 is located in the horizontal direction relative to the screen 30. The concave mirror 40 has a reflection surface 41 that reflects a laser beam that has been reflected by the scanned surface 31 of the screen 30 toward the projection surface 91 of the windshield 90. The reflection surface 41 has a concave shape that is smoothly curved and a middle portion of which concaves in a direction away from the scanned surface 31 and the projection surface 91. The reflection surface 41 reflects the display image 71, which has been reflected by the scanned surface 31, while magnifying, thereby projecting the display image 71 onto the projection surface 91. A rate of magnification of the display image 71 by the curve of the reflection surface 41 is different in the horizontal direction and the vertical direction of the display image 71. Specifically, in the reflection surface 41, the curve in the horizontal direction is greater than the curve in the vertical direction so that the display image 71 is more magnified in the horizontal direction than in the vertical direction.

(Characteristic Structure)

Figure 4:
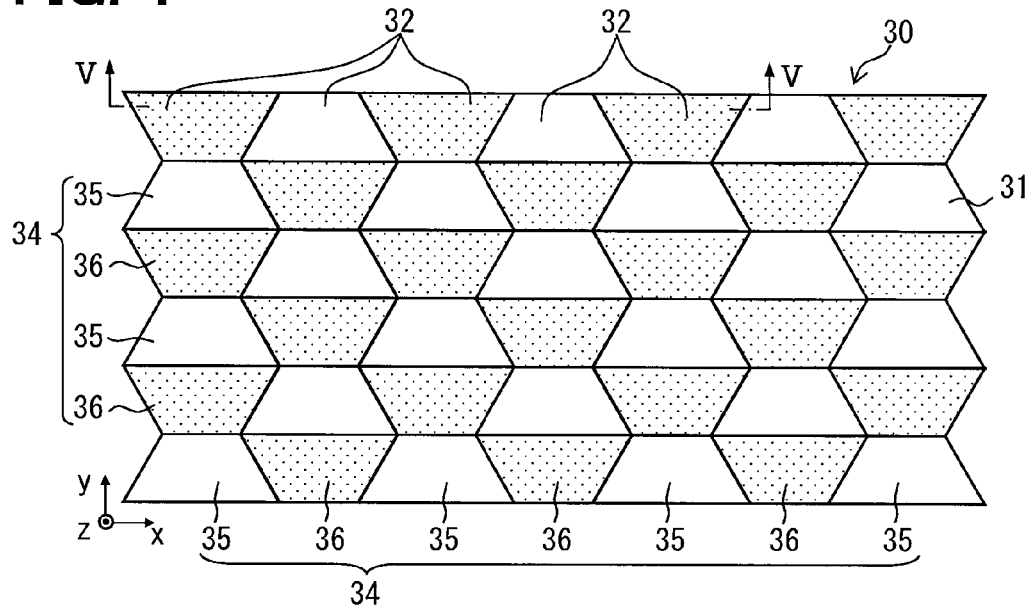
FIG. 4 is a diagram schematically illustrating an arrangement of two kinds of micromirrors in the micromirror array used as the screen.
Figure 5:
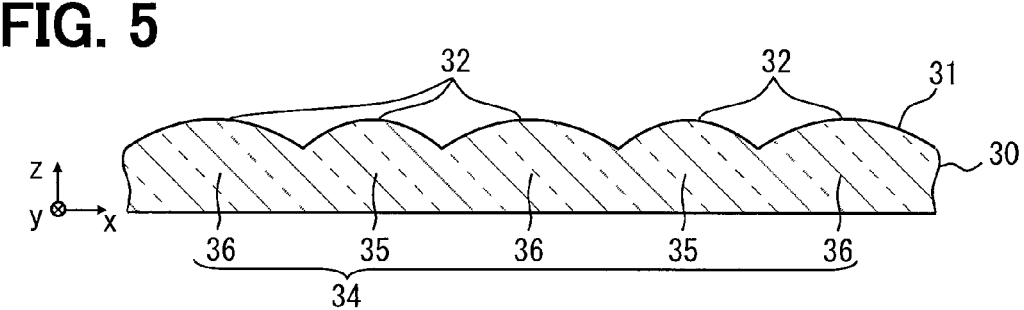
FIG. 5 is a diagram illustrating a cross-section taken along a line V-V in FIG. 4.

Next, the screen 30, which is a characteristic structure of the head-up display apparatus 100 of the first embodiment of the present disclosure, will be described. As shown in FIGS. 3 to 5, the micromirrors 34 includes first micromirrors 35 (indicated only by outline in FIG. 4) and second micromirrors 36 (indicated with dots in FIG. 4). The first micromirror 35 has a shape that is plane symmetry with the second micromirror 36 with respect to a zx plane. The first micromirrors 35 and the second micromirrors 36 are alternately arranged in the x-axis direction and in the y-axis direction. Since the micromirrors 35, 36 are arrayed in such a manner, in a cross-section defined along the zx plane intersecting the scanned surface 31 as shown in FIG. 5, curved shapes of the adjacent convex surface portions 32 are reciprocally different in the x-axis direction. Likewise, in a cross-section defined along a yz plane intersecting the scanned surface 31, curved shapes of the adjacent convex surface portions 32 are reciprocally different in the y-axis direction. As described above, the scanned surface 31 is formed in such a manner that the convex surface portions 32 having two kinds of different curved shapes are alternately arranged.

Figure 6:
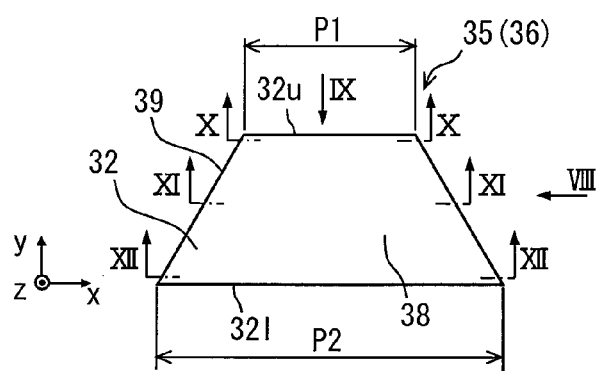
FIG. 6 is a diagram for explaining the shape of a micromirror.

As shown in FIG. 6, each of the convex surface portions 32 of the micromirrors 35, 36 has a quadrilateral and trapezoidal outline 39. In the convex surface portion 32, when an area encompassed by the outline 39 is referred to as an opening 38 of each of the micromirrors 35, 36, the area of the opening 38 is equal between the micromirrors 35, 36. Since the area of the opening 38 of each of the convex surface portions 32 is substantially the same, variations in the quantity of the laser beams emitted from the convex surface portions 32 toward the eye box 60 (see FIG. 1B) is reduced.

A ratio of a length P1 of an upper side $32u$ and a length P2 of a lower side $32l$ of the convex surface portion 32 is preferably defined in a range from 1:1 to 1:2. In the first embodiment, the ratio of the length P1 and the length P2 is approximately 1:2. When the ratio of the upper side $32u$ and the lower side $32l$ is defied into the range described above, a decrease in usage efficiency of the laser beam being applied to each convex surface portion 32 and being used to the display image 71 (see FIG. 2) can be restricted.

Figure 7:
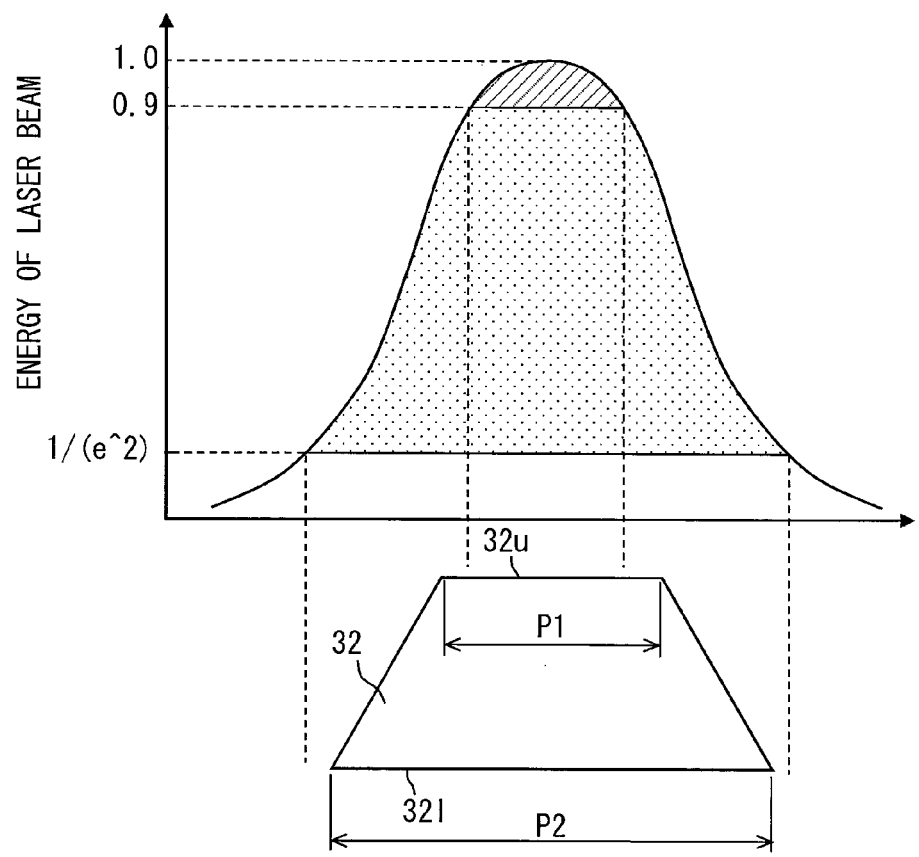
FIG. 7 is a graph for explaining a relationship between the shape of the micromirror and an energy distribution of a laser beam.

To describe in detail, as shown in FIG. 7, energy of the laser beam reduces from the center toward an outer periphery of the laser beam according to Gaussian distribution. In general, an energy range higher than $1/(e^2)$ (see a dotted area in FIG. 7) can be generally used. The effect of decreasing the unevenness due to diffraction interference, which will be described later, improves with an increase in the ratio of the length P1 of the upper side $32u$ to the length P2 of the lower side $32l$. However, when the length P1 of the upper side $32u$ is defined such that the energy of the laser beam is in a range greater than 0.9 (see a range with diagonal lines in FIG. 7), and the ratio of the length P2 to the length P1 is increased, the energy of the laser beam applied to a vicinity of the lower side $32l$ is lower than $1/(e^2)$. In this case, the laser beam reflected in the vicinity of the lower side $32l$ is weak. As a result, the laser beams reaching the eye box 60 (see FIG. 1B) have unevenness in intensity distribution. To avoid such a circumstance, it is preferable that the ratio of the length P1 and the length P2 is set approximately upto 1:2 so that the length P2 of the lower side $32l$ is shorter than a distance between two points that are on the energy of $1/(e^2)$.

Figure 8:
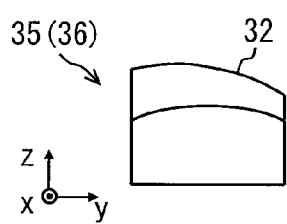
FIG. 8 is a diagram illustrating a side view of the micromirror.
Figure 9:
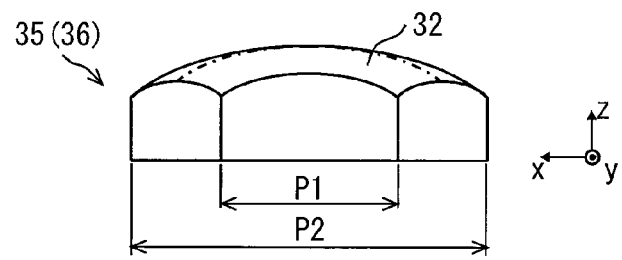
FIG. 9 is a diagram illustrating a front view of the micromirror.
Figure 10:
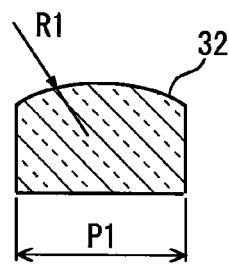
FIG. 10 is a diagram illustrating a cross-section taken along a line X-X in FIG. 6.
Figure 11:
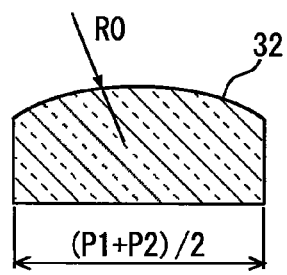
FIG. 11 is a diagram illustrating a cross-section taken along a line XI-XI in FIG. 6.
Figure 12:
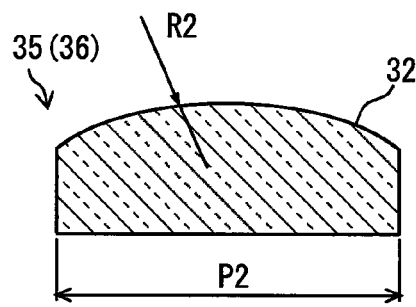
FIG. 12 is a diagram illustrating a cross-section taken along a line XII-XII in FIG. 6.

As shown in FIGS. 8 and 9, in a cross section along the zx plane, a radius of curvature of the convex surface portion 32 continuously varies in the y-axis direction. As shown in FIG. 11, in the cross section along the zx plane, a radius of curvature of the convex surface portion 32 at a center portion along the y-axis direction is defined as R0. In this case, as shown in FIG. 10, a radius of curvature R1 of an upper side portion in the cross section along the zx plane is set as R1=2×P1/(P1+P2)×R0. On the other hand, as shown in FIG. 12, a radius of curvature R2 of a lower side portion in the cross section along the zx plane is set as R2=2×P2/(P1+P2)×R0. When the radius of curvature R0 to R2 are set in the manner as described above, it is possible to restrict a step surface from being generated along the z-axis direction at a boundary between the adjacent micromirror 35 and micromirror 36.

Figure 13:
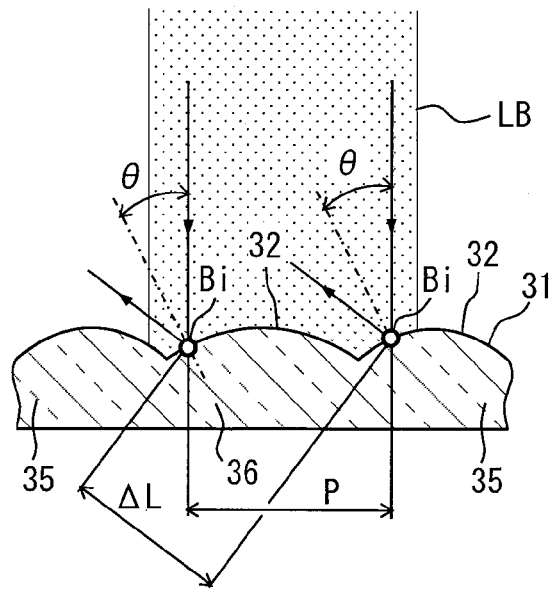
FIG. 13 is a diagram for explaining a condition under which laser beams interfere with each other due to diffraction.

Next, the reason why the unevenness of brightness occurs in the display image 71 will be explained. As shown in FIG. 13, a diameter of a laser beam LB applied to the scanned surface 31 is greater than each of the micromirrors 35, 36. On the adjacent convex surface portions 32 of the scanned surface 31, there are portions at which the normal directions coincide to each other (as indicated by Bi in FIG. 13). Thus, a part of the laser beam LB applied to the scanned surface 31 is reflected and diffracted in the same direction from each of the adjacent micromirrors 35, 36. When an optical path difference ΔL between the laser beams reflected in the same direction satisfies an equation of ΔL=P×sin(2θ)=n×λ, these laser beams are interfered with each other and intensified. As a result, intensity distribution occurs in the virtual image 70 of the display image 71. In the above equation, P is an interval between the portions Bi of the adjacent convex surface portions 32 at which the normal directions thereof coincide, θ is an angle of incidence of the laser beam, λ is a wavelength of the laser beam, and n is a degree.

In the screen 30 of the first embodiment, the adjacent convex surface portions 32 have the different curved shapes, as described above. Therefore, the distance between the adjacent portions Bi at which the normal directions thereof coincide is uneven among the convex surface portions 32. For example, a center of the convex surface portion 32 having the normal direction in the z-axis direction is referred to as a portion Ba. Intervals from the portion Ba of a specific first micromirror 35c to the portions Ba of the second micromirrors 36u, 36r, 36d and 36l surrounding the specific first micromirror 35c are, respectively, referred to as Pa_u, Pa_r, Pa_d and Pa_l. Among the intervals Pa_u, Pa_r, Pa_d and Pa_l, although the value of the interval Pa_r is equal to the value of the interval Pa_l, the values of the intervals Pa_u, Pa_r (Pa_l), and Pa_d are different from each other.

Further, portions where the normal directions thereof coincide, other than the center of the convex surface portion 32, are referred to as portions Bb. Intervals from the portion Bb of a specific second micromirror 36d to the portions Bb of the first micromirrors 35c, 35r, 35d and 35l surrounding the specific second micromirror 35d are, respectively, referred to as Pb_u, Pb_r, Pb_d and Pb_l. Among the intervals Pa_u, Pa_r, Pa_d and Pa_l, although the value of the interval Pa_r is equal to the value of the interval Pa_l, the values of the intervals Pa_u, Pa_r (Pa_l), and Pa_d are different from each other.

Figure 14:
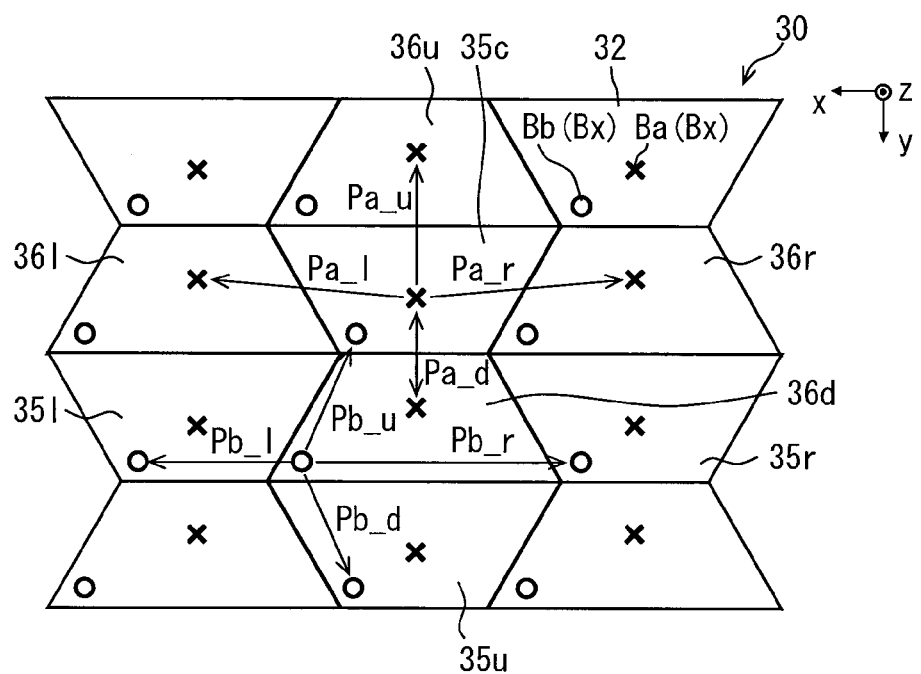
FIG. 14 is a diagram illustrating a positional relationship of portions where the normal directions coincide on a scanned surface.
Figure 15:
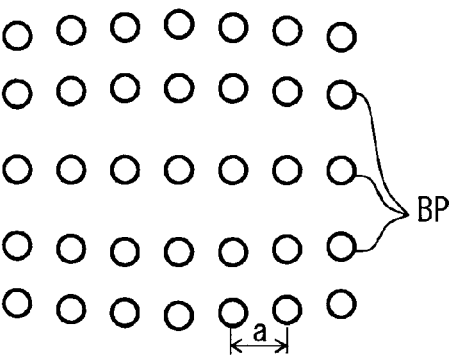
FIG. 15 is a diagram illustrating examples of patterns of bright portions caused by the interference of the laser beams according to the first embodiment of the present disclosure.

The laser beams reflected and diffracted by the screen 30 interfere with each other and cause spotted bright portions BP. Examples of patterns of the bright portions BP will be described with reference to FIG. 15. When the first micromirror 35c and the second micromirror 36u are applied with the laser beam, the bright portions BP are generated in a pattern as shown in (a) of FIG. 15. When the first micromirror 35c and the second micromirror 36d (see FIG. 14) are applied with the laser beam by scanning of the laser scanner 10 (see FIG. 2), the bright portions BP are generated in a pattern as shown in (b) of FIG. 15. When the first micromirror 35c and the second micromirror 36r (see FIG. 14) are applied with the laser beam, the bright portions BP are generated in a pattern as shown in (c) of FIG. 15. When the first micromirror 35c and the second micromirror 36l (see FIG. 14) are applied with the laser beam, the bright portions BP are generated in a pattern as shown in (d) of FIG. 15.

Figure 16:
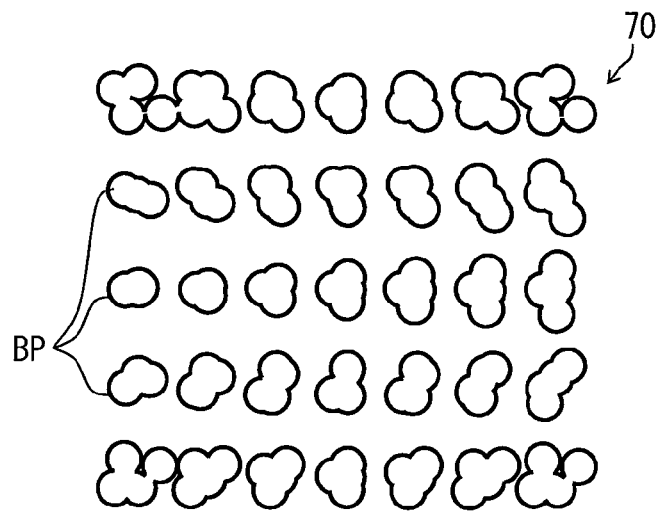
FIG. 16 is a diagram for explaining a virtual image made by overlapping the patterns of the bright portions according to the first embodiment of the present disclosure.

As described above, the bright portions BP at which the laser beams having been diffracted by the convex surface portions 32 (see FIG. 14) are intensified by interference are formed in uneven arrangement. Therefore, when the laser beam is scanned at high speed to form the display image 71, the locations of the bright portions BP at which the laser beams are intensified by the interference move with time at high speed that cannot be perceived by a viewer. As a result, the viewer sees the virtual image 70 provided by overlapping of the patterns of the bright portions BP being unevenly arranged, as shown in FIG. 16.

An average of the intervals P defined between the portions Bi at which the normal directions coincide between the adjacent convex surface portions 32 as shown in FIG. 13 is referred to as an average interval Pav. A rate of magnification of the display image 71 by the reflection surface 41 of the concave mirror and the projection surface 91 of the windshield 90, as shown in FIG. 1B, is referred to as a magnification rate M. A distance of an optical path from the scanned surface 31 to the eye box 60 is referred to as an optical path length L, and a maximum wavelength of the laser beam is referred to as a maximum wavelength λmax. A diameter of an assumed pupil of the eye of a viewer is referred to as a diameter d. The average interval Pav, the magnification rate M, the optical path length L, the maximum wavelength λmax, and the diameter d are defined to satisfy the following expression 1.

$$d > L \times \tan\{\sin^{-1}(\lambda/\text{Pav})/M\} \quad \text{(Ex. 1)}$$

In general, the diameter d of the pupil is approximately 2 millimeters. When the average interval Pav is defined such that the right side of the expression 1 is smaller than 2 millimeters, the average of intervals a (see FIG. 15) of the bright portions BP at which the laser beams reaching the eye box 60 intensify with each other due to the interference is smaller than the assumed diameter d of the pupil of a viewer. As such, it is possible to keep a state where the plural bright portions BP are viewed in the pupil of the eye.

According to the first embodiment described hereinabove, in the virtual image 70 made by overlapping of the patterns of the bright portions BP unevenly arranged, as shown in FIG. 16, light and darkness of the patterns are complimented to each other. Therefore, the intensity distribution of the laser beams reaching the eye box 60 (see FIG. 1B) can be substantially equalized. Accordingly, in the screen 30 in which the convex surface portions 32 having the different curved shapes are arranged, it is possible to reduce the unevenness of the brightness of the display image 71 caused by the interference of the laser beams, while restricting the structure of the screen 30 from being complicated.

In the first embodiment, moreover, the outline of each convex surface portion 32 is quadrilateral. Since the micromirrors 35, 36 are alternately arranged in the x-axis direction and the y-axis direction, the adjacent convex surface portions 32 have different curved shapes on the scanned surface 31. Since the complication of the shape of the scanned surface 31 is reduced, it is possible to manufacture the screen 30 that is capable of reducing the unevenness of the display image 71.

In the first embodiment, the outline 39 has the trapezoidal shape in which the length P1 of the upper side 32u and the length P2 of the lower side 32l have the ratio of approximately 1:2. Therefore, it is less likely that the unevenness of the intensity distribution of the laser beam reaching the eye box 60 will be increased. Since the decrease in the utilization efficiency of the laser beams to the display image 71 is restricted, it is possible to reduce the unevenness of the brightness of the display image 71 while maintaining the brightness of the entirety of the display image 71 at high brightness. As such, the quality of display of the virtual image 70 further improves.

In the first embodiment, the area of the opening 38 is equalized in the microlenses 34. Therefore, variations in brightness of the pixels forming the virtual image 70 can be reduced. As a result, not only the unevenness of the brightness due to the diffraction interference but also the unevenness of the brightness of each of the pixels can be reduced.

In the first embodiment, moreover, it is possible to keep the state that the plural bright portions BP are viewed by the pupil of the eye. Therefore, it is further difficult for the viewer to perceive the light and darkness in the virtual image 70 of the display image 71. Therefore, it is possible to further improve the quality of display of the virtual image 70.

In the first embodiment, the laser scanner 10 corresponds to a "laser scanning device" of claims. The concave mirror 40 corresponds to an "optical system" of the claims. The screen 30 corresponds to a "screen member" of the claims. The micromirrors 34 corresponds to "optical elements" of the claims. The convex surface portions 32 correspond to "curved surface portions" of the claims. The eye box 60 correspond to an "viewing space" of the claims. The windshield 90 corresponds to a "display member" of the claims.

(Second Embodiment)

Figure 17:
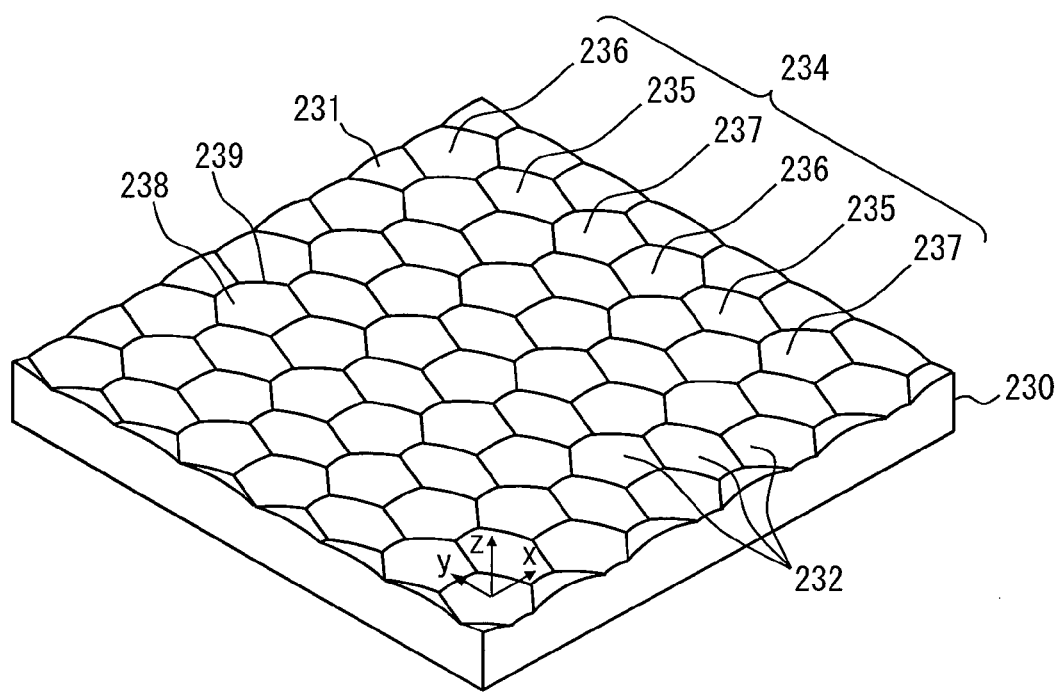
FIG. 17 is a diagram schematically illustrating a perspective view of a micromirror array used as a screen according to a second embodiment of the present disclosure.
Figure 18:
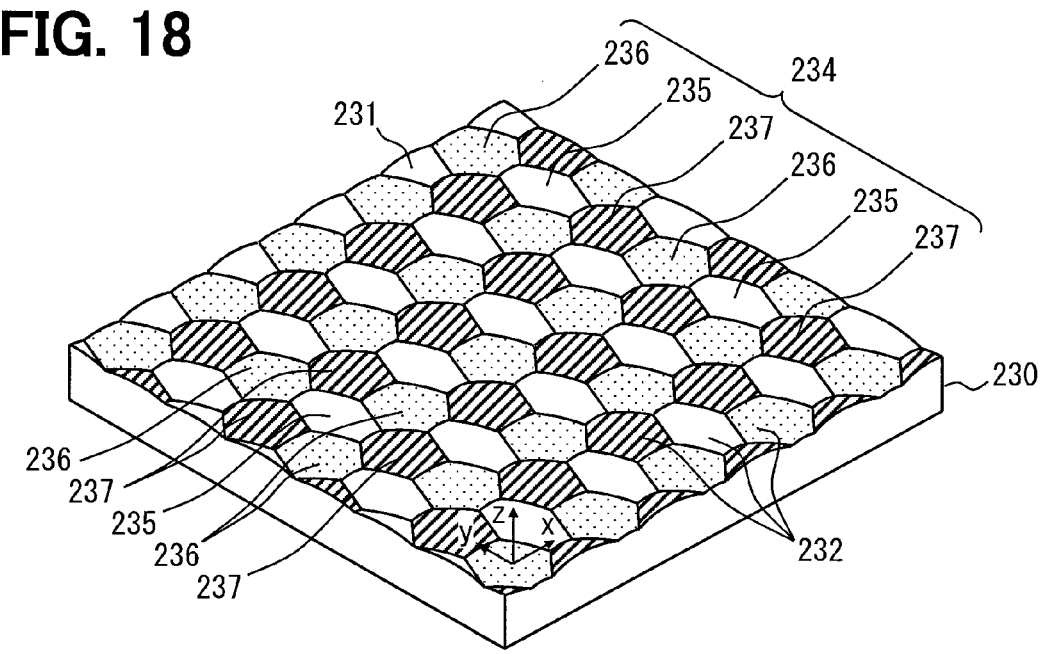
FIG. 18 is a diagram schematically illustrating a perspective view of the micromirror array with an arrangement of three kinds of micromirrors according to the second embodiment of the present disclosure.

A second embodiment of the present disclosure as shown in FIGS. 17 and 18 is a modification of the first embodiment. A screen 230 of the second embodiment is a so-called hexagonal dense micromirror array. In the screen 230, micromirrors 234 include first micromirrors 235 (indicated only by an outline in FIG. 18), second micromirror 236 (indicated with dots in FIG. 18) and third micromirrors 237 (indicated with diagonal lines in FIG. 18).

The first to third micromirrors 235, 236 and 237 are repetitively arranged in a specific order in the y-axis direction. In other words, one first micromirror 235 is surrounded by the second micromirrors 236 and the third micromirrors 237, which are alternately arranged (see FIG. 18). Since the first to third micromirrors 235, 236, 237 are arranged in such an array, adjacent convex surface portions 232 have different curved shapes. In the second embodiment, the convex surface portions 232 have three different curved shapes repeatedly arranged in the specific order, as described above, and a scanned surface 231 is provided by the convex surface portions 232.

In addition, the convex surface portion 232 of each of the first to third micromirrors 235, 236, 237 shown in FIG. 17 has a hexagonal outline 239. Also in the second embodiment, the area of the opening 238 of each of the micromirrors 235, 236, 237 is equalized. Therefore, variations in quantity of the laser beams emitted toward the eye box 60 (see FIG. 1B) from the convex surface portions 232 are reduced.

Also in the second embodiment described hereinabove, the virtual image 70 (see FIG. 1B) made by overlapping of the plural patterns of the bright portions unevenly arranged can be viewed by a viewer. Since the light and darkness of the patterns are complemented to each other, the intensity distribution of the laser beams reaching the eye box 60 (see FIG. 1B) can be substantially equalized. Therefore, even in the hexagonal dense micromirror array, the complication of the structure is reduced by the array of the three types or more of the convex surface portions 232. Further, it is possible to reduce the brightness unevenness of the display image 71 caused by the interference of the laser beams.

In the second embodiment, the outline 239 of each of the convex surface portions 232 has the hexagonal shape. The micromirrors 235, 236, 237 are repetitively arranged in the y-axis direction. Therefore, on the scanned surface 231, the adjacent convex surface portions 232 have different curved shapes. Since the complication of the shape of the scanned surface 231 is restricted, it is possible to manufacture the screen 230.

In the second embodiment, the screen 230 corresponds to a "screen member" of claims. The micromirrors 234 correspond to "optical elements" of the claims. The convex surface portions 232 correspond to "curved surface portions" of the claims.

(Third Embodiment)

Figure 19:
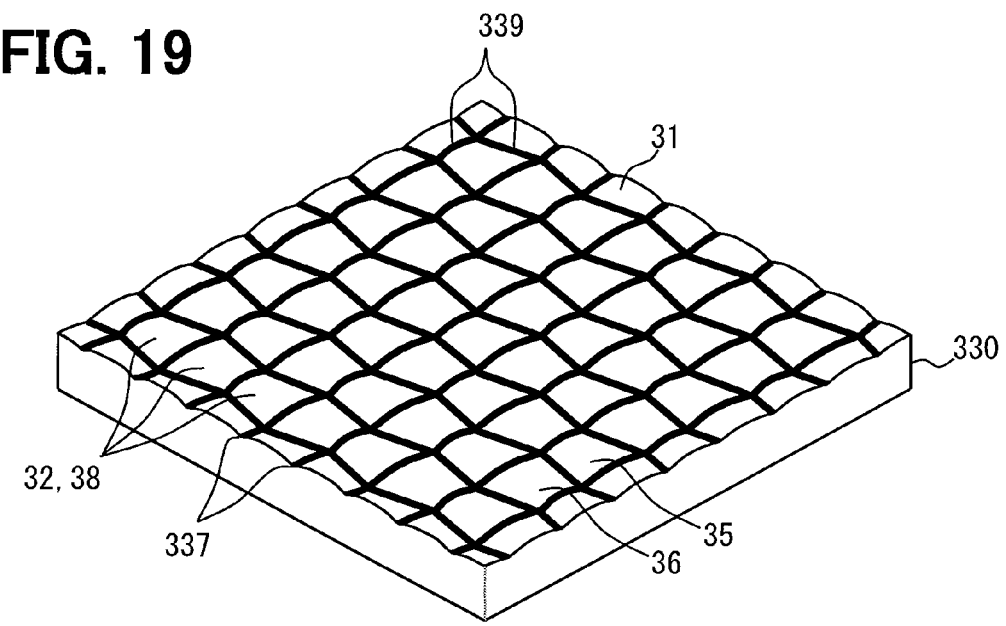
FIG. 19 is a diagram schematically illustrating a perspective view of a micromirror array used as a screen according to a third embodiment of the present disclosure.

A third embodiment of the present disclosure shown in FIG. 19 is a modification of the first embodiment. A screen 330 of the third embodiment has a shielding portion 339 between the first micromirrors 35 and the second micromirrors 36. The shielding portion 339 is made of a lightproof resin and is formed into a lattice shape. The shielding portion 339 covers the boundary 337 between the adjacent convex surface portions 32. The shielding portion 339 blocks the laser beam from transmitting. Therefore, the shielding portion 339 restricts reflection of the laser beam in the vicinity of the boundary 337. The shielding portion 339 may be formed by lightproof printing or the like. An area covered with the shielding portion 339 is preferably less than 10% of the area of the opening 38.

In the third embodiment described hereinabove, the boundary 337 between the convex surface portions 32, at which the shape of the scanned surface 31 possibly varies sharply, is covered with the shielding portion 339. Therefore, local unevenness of brightness in the virtual image 70 (see FIG. 1B) due to the laser beam reflected by the boundary 337 can be avoided. Accordingly, in addition to the effect of equalizing the intensity distribution of the laser beams reaching the eye box 60 (see FIG. 1B), the quality of display of the virtual image 70 further improves.

In the third embodiment, the screen 330 corresponds to a "screen member" of claims.

(Other Embodiments)

The embodiments of the present disclosure are described hereinabove. However, the present disclosure is not limited to the embodiments described above, but various embodiments and combinations are applicable without departing from the gist of the present disclosure.

In the embodiments described above, the screen is the micromirror array provided by the array of the micromirrors as the optical elements. Alternatively, the screen may be provided by a microlens array provided by the array of microlens as the optical elements.

In the embodiments described above, the rate of magnification of the display image 71 is the value provided by combination of the rate of magnification by the reflection surface 41 of the concave mirror 40 and the rate of magnification by the projection surface 91 of the windshield 90. For example, when the projection surface has a flat shape, the magnification rate M of the expression 1 is substantially equal to the rate of magnification by the reflection surface of the concave mirror as the optical system. Likewise, when the reflection surface in the optical system has a flat shape, the magnification rate M of the expression 1 is substantially equal to the rate of magnification of the projection surface of the vehicle to which the head-up display apparatus is assumed to be equipped.

In the first and third embodiments described above, the screen is the lattice-shaped microlens array in which the two types of the microlens are alternately arranged. Alternatively, the three or more types of the shapes of the microlens may be arranged. When the screen is the hexagonal dense microlens array as in the second embodiment, the screen may be provided by combining four or more types of the microlenses. The shape of opening of the microlens may not be limited to the quadrilateral or hexagon. For example, the screen may have a scanned surface on which polygons having irregular shapes but having an equal opening area.

In the embodiments described above, the area of the opening of each microlens is equalized. Alternatively, it is not always necessary that the area of the opening is exactly the same, as long as the variations in the area of the openings are less than approximately 15%.

In the embodiments described above, the present disclosure is employed to the head-up display apparatus that is equipped to the vehicle and projects the display image 71 to the windshield 90. However, the present disclosure may be employed to various head-up display apparatuses that are mounted in any transportation equipment and generate the display image 71 so that the virtual image 70 thereof can be viewed by a viewer.

The invention claimed is:

1. A screen member having a scanned surface to which a laser beam is scanned to generate a display image on the scanned surface to be viewed from a predetermined viewing space, the screen member comprising
   a plurality of optical elements each having a curved surface portion that is curved to magnify a laser beam toward the viewing space, the curved surface portions of the plurality of optical elements being arranged to provide the scanned surface, wherein,
   in a cross-section intersecting the scanned surface, adjacent curved surface portions have different curved shapes;
   each of the curved surface portions has a quadrilateral outline when the screen member is viewed in a direction orthogonal to the scanned surface, and
   the curved surface portions having two or more types of different curved shapes are alternately arranged to provide the scanned surface.

2. The screen member according to claim 1, wherein
   an area of an opening encompassed with an outline of the curved surface portion is equalized between the plurality of optical elements.

3. The screen member according to claim 1, further comprising
   a shielding portion that covers a boundary between the adjacent curved surface portions to restrict the laser beam from transmitting.

4. A head-up display apparatus for projecting a display image onto a projection surface of a display member such that a virtual image of the display image is viewed by a viewer from a viewing space, the head-up display apparatus comprising:
   the screen member according to claim 1;
   a laser scanning device generating the display image on the scanned surface by scanning the laser beam; and
   an optical system projecting the display image generated on the scanned surface onto the projection surface while magnifying the display image.

5. The screen member according to claim 1, wherein each of the curved surface portions has a single curve.

6. The screen member according to claim 1, wherein each of the curved surface portions is a convex curved surface portion.

7. A screen member having a scanned surface to which a laser beam is scanned to generate a display image on the scanned surface to be viewed from a predetermined viewing space, the screen member comprising
   a plurality of optical elements each having a curved surface portion that is curved to magnify a laser beam toward the viewing space, the curved surface portions of the plurality of optical elements being arranged to provide the scanned surface, wherein,
   in a cross-section intersecting the scanned surface, adjacent curved surface portions have different curved shapes;
   each of the curved surface portions has a trapezoidal outline when the screen member is viewed in a direction orthogonal to the scanned surface, and
   a ratio of an upper side to a lower side of the trapezoidal outline of the curved surface portion is set to a range from 1:1 to 1:2.

8. The screen member according to claim 7, wherein each of the curved surface portions has a single curve.

9. The screen member according to claim 7, wherein each of the curved surface portions is a convex curved surface portion.

10. A screen member having a scanned surface to which a laser beam is scanned to generate a display image on the scanned surface to be viewed from a predetermined viewing space, the screen member comprising
    a plurality of optical elements each having a curved surface portion that is curved to magnify a laser beam toward the viewing space, the curved surface portions of the plurality of optical elements being arranged to provide the scanned surface, wherein,
    in a cross-section intersecting the scanned surface, adjacent curved surface portions have different curved shapes;
    each of the curved surface portions has a hexagonal outline when the screen member is viewed in a direction orthogonal to the scanned surface, and
    the curved surface portions having three or more types of different curved shapes are repetitively arranged in a specific order to provide the scanned surface.

11. The screen member according to claim 10, wherein each of the curved surface portions has a single curve.

12. The screen member according to claim 10, wherein each of the curved surface portions is a convex curved surface portion.

13. A head-up display apparatus for projecting a display image onto a projection surface of a display member such that a virtual image of the display image is viewed by a viewer from a viewing space, the head-up display apparatus comprising:
    a screen member having a scanned surface to which a laser beam is scanned to generate a display image on the scanned surface to be viewed from a predetermined viewing space, the screen member comprising
    a plurality of optical elements each having a curved surface portion that is curved to magnify a laser beam toward the viewing space, the curved surface portions of the plurality of optical elements being arranged to provide the scanned surface, wherein,
    in a cross-section intersecting the scanned surface, adjacent curved surface portions have different curved shapes, the head-up display apparatus further comprising:

a laser scanning device generating the display image on the scanned surface by scanning the laser beam; and an optical system projecting the display image generated on the scanned surface onto the projection surface while magnifying the display image; wherein an average of intervals of portions of the adjacent curved surface portions at which normal directions coincide is referred to as an average interval Pav, a rate of magnification of the display image by the optical system and the projection surface is referred to as a magnification rate M, a distance of an optical path from the scanned surface to the viewing space is referred to as an optical path distance L, a maximum wavelength of the laser beam projected by the laser scanning device is referred to as a maximum wavelength $\lambda$max, and an assumed diameter of a pupil of an eye of the viewer is referred to as a diameter d, wherein the average interval Pav, the magnification rate M, the optical path distance L, and the maximum wavelength $\lambda$max, and the diameter d satisfy a following expression 1, $$d > L \times \tan\{\sin^{-1}(\lambda max/Pav)/M\}. \quad \text{(Ex. 1)}$$

14. The screen member according to claim 13, wherein each of the curved surface potions has a quadrilateral outline, and the curved surface portions having two or more types of different curved shapes are alternately arranged to provide the scanned surface.

15. The screen member according to claim 13, wherein each of the curved surface portions has a trapezoidal outline, and a ratio of an upper side to a lower side of the trapezoidal outline of the curved surface portion is set to a range from 1:1 to 1:2.

16. The screen member according to claim 13, wherein each of the curved surface portions has a hexagonal outline, and the curved surface portions having three or more types of different curved shapes are repetitively arranged in a specific order to provide the scanned surface.

17. The screen member according to claim 13, wherein an area of an opening encompassed with an outline of the curved surface portion is equalized between the plurality of optical elements.

18. The screen member according to claim 13, further comprising a shielding portion that covers a boundary between the adjacent curved surface portions to restrict the laser beam from transmitting.

* * * * *